US011280271B2

(12) United States Patent
Levasseur et al.

(10) Patent No.: US 11,280,271 B2
(45) Date of Patent: Mar. 22, 2022

(54) OPERABILITY GEARED TURBOFAN ENGINE INCLUDING COMPRESSOR SECTION VARIABLE GUIDE VANES

(71) Applicant: United Technologies Corporation, Hartford, CT (US)

(72) Inventors: Glenn Levasseur, Colchester, CT (US); Gabriel L. Suciu, Glastonbury, CT (US); Gary M. Stetson, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 119 days.

(21) Appl. No.: 14/433,444

(22) PCT Filed: Oct. 3, 2013

(86) PCT No.: PCT/US2013/063288
§ 371 (c)(1),
(2) Date: Apr. 3, 2015

(87) PCT Pub. No.: WO2014/058710
PCT Pub. Date: Apr. 17, 2014

(65) Prior Publication Data
US 2015/0233302 A1     Aug. 20, 2015

Related U.S. Application Data

(60) Provisional application No. 61/775,088, filed on Mar. 8, 2013, provisional application No. 61/711,438, filed on Oct. 9, 2012.

(51) Int. Cl.
*F02C 7/36* (2006.01)
*F02C 9/20* (2006.01)
(Continued)

(52) U.S. Cl.
CPC .............. *F02C 7/36* (2013.01); *F01D 17/162* (2013.01); *F02C 3/064* (2013.01); *F02C 7/32* (2013.01);
(Continued)

(58) Field of Classification Search
CPC .... F02C 7/36; F02C 3/06; F02C 3/107; F02C 3/113; F02C 3/064; F02C 9/20;
(Continued)

(56) References Cited

U.S. PATENT DOCUMENTS 4,252,498 A    2/1981  Radcliffe et al.
4,841,721 A  * 6/1989  Patton ................... F01K 21/047
                                                  60/39.181
(Continued)

FOREIGN PATENT DOCUMENTS

KR    1019990046884    7/1999

OTHER PUBLICATIONS

International Search Report and Written Opinion for PCT/US2013/063288 completed on Dec. 24, 2013.
(Continued)

*Primary Examiner* — Andrew H Nguyen
(74) *Attorney, Agent, or Firm* — Carlson, Gaskey & Olds, P.C.

(57) ABSTRACT

A gas turbine engine has a fan which includes a plurality of fan blades that are rotatable about an axis, and a compressor section, where the combustor section includes a first compressor and a second compressor aft of the first compressor. At least one first variable guide vane controls operation of the first compressor and at least one second variable guide vane controls operation of the second compressor. A combustor is in fluid communication with the compressor section and a turbine section is in fluid communication with the
(Continued)

combustor. A geared architecture is driven by the turbine section for rotating the fan about the axis.

13 Claims, 4 Drawing Sheets

(51) Int. Cl.
    *F02C 3/06*           (2006.01)
    *F01D 17/16*         (2006.01)
    *F02C 7/32*           (2006.01)

(52) U.S. Cl.
    CPC ............ *F02C 9/20* (2013.01); *F05D 2220/32* (2013.01); *F05D 2260/4031* (2013.01)

(58) Field of Classification Search
    CPC .. F05D 2240/12; F05D 2240/10; F01D 17/16; F01D 17/162
    See application file for complete search history.

(56) References Cited

U.S. PATENT DOCUMENTS

| | | | |
|---|---|---|---|
| 4,928,482 | A | 5/1990 | Pollak et al. |
| 5,622,472 | A | 4/1997 | Glowacki |
| 5,622,473 | A | 4/1997 | Payling |
| 5,911,679 | A | 6/1999 | Farrel et al. |
| 7,125,222 | B2 | 10/2006 | Cormier et al. |
| 7,713,022 | B2 | 5/2010 | Major et al. |
| 7,806,652 | B2 | 10/2010 | Major et al. |
| 8,197,209 | B2 | 6/2012 | Wagner |
| 8,328,512 | B2 | 12/2012 | Major et al. |
| 8,337,149 | B1 | 12/2012 | Hasel et al. |
| 2003/0163983 | A1* | 9/2003 | Seda .......... F01D 5/03 60/226.1 |
| 2006/0228206 | A1* | 10/2006 | Decker .......... F01D 5/141 415/1 |
| 2009/0056306 | A1* | 3/2009 | Suciu .......... F02K 3/06 60/226.1 |
| 2009/0188334 | A1* | 7/2009 | Merry .......... F02C 7/32 74/15.2 |
| 2009/0317229 | A1* | 12/2009 | Suciu .......... F01D 17/162 415/1 |
| 2011/0176913 | A1* | 7/2011 | Wassynger .......... F01D 17/162 415/159 |
| 2012/0087780 | A1 | 4/2012 | Suciu et al. |
| 2012/0171018 | A1* | 7/2012 | Hasel .......... F02C 3/107 415/122.1 |
| 2012/0192570 | A1 | 8/2012 | McCune et al. |
| 2012/0233982 | A1 | 9/2012 | Suciu et al. |
| 2012/0251297 | A1 | 10/2012 | Major et al. |

OTHER PUBLICATIONS

International Preliminary Report on Patentability for International Application No. PCT/US2013/063288 dated Apr. 23, 2015.
Extended European Search Report for European Application No. 13845694.2, dated Jun. 16, 2016.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Pepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

\* cited by examiner

OPERABILITY GEARED TURBOFAN ENGINE INCLUDING COMPRESSOR SECTION VARIABLE GUIDE VANES

This application is a United States National Phase of PCT Application No. PCT/US2013/063288 filed on Oct. 3, 2013 which claims priority to U.S. Provisional Application No. 61/775,088 filed Mar. 8, 2013 and U.S. Provisional Application No. 61/711,438 filed Oct. 9, 2012.

This application claims priority to provisional application No. 61/711,438 filed on Oct. 9, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In one type of engine, the compressor section typically includes low and high pressure compressors, and the turbine section includes low and high pressure turbines. The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Other types of engines have been used, such as direct drive configurations in which no gear train is used, or such as three spool configurations in which three discrete turbine are provided. Although geared architectures have improved propulsive efficiency, turbine engine manufacturers continue to seek further improvements to engine performance including improvements to thermal, transfer and propulsive efficiencies.

SUMMARY

In one exemplary embodiment, a gas turbine engine has a fan which includes a plurality of fan blades that are rotatable about an axis, and a compressor section, where the combustor section includes a first compressor and a second compressor aft of the first compressor. At least one first variable guide vane controls operation of the first compressor and at least one second variable guide vane controls operation of the second compressor. A combustor is in fluid communication with the compressor section and a turbine section is in fluid communication with the combustor. A geared architecture is driven by the turbine section for rotating the fan about the axis.

In a further embodiment of the above, the pressure ratio of the first compressor is in the range of 4:1 to 7:1.

In a further embodiment of any of the above, the pressure ratio of the second compressor is in the range of 8:1 to 15:1.

In a further embodiment of any of the above, the compressor section includes an overall pressure ratio in the range of 40:1 to 70:1.

In a further embodiment of any of the above, the pressure ratio of the second compressor is in the range of 8:1 to 15:1.

In a further embodiment of any of the above, the turbine section includes a first turbine and a second turbine arranged aft of the first turbine. The first compressor and the second turbine are mounted to a first spool. The second compressor and the first turbine are mounted on a second spool.

In a further embodiment of any of the above, the geared architecture is coupled between the first spool and the fan section.

In a further embodiment of any of the above, the geared architecture is arranged forward of the combustor.

In a further embodiment of any of the above, the gas turbine engine is a high bypass geared aircraft engine that has a bypass ratio of greater than about 6:1.

In a further embodiment of any of the above, the gas turbine engine includes a fan pressure ratio of less than about 1.45:1.

In a further embodiment of any of the above, the second turbine has a pressure ratio that is greater than about 5:1.

In a further embodiment of any of the above, the gas turbine engine includes multiple stages of first variable guides in the first compressor.

In a further embodiment of any of the above, the gas turbine engine includes multiple stages of second variable guides in the second compressor.

In a further embodiment of any of the above, the compressor section includes an overall pressure ratio in the range of 40:1 to 70:1.

In a further embodiment of any of the above, the compressor section includes an overall pressure ratio of greater than 70:1.

BRIEF DESCRIPTION OF THE DRAWINGS

The disclosure can be further understood by reference to the following detailed description when considered in connection with the accompanying drawings wherein.

DETAILED DESCRIPTION

Figure 1:
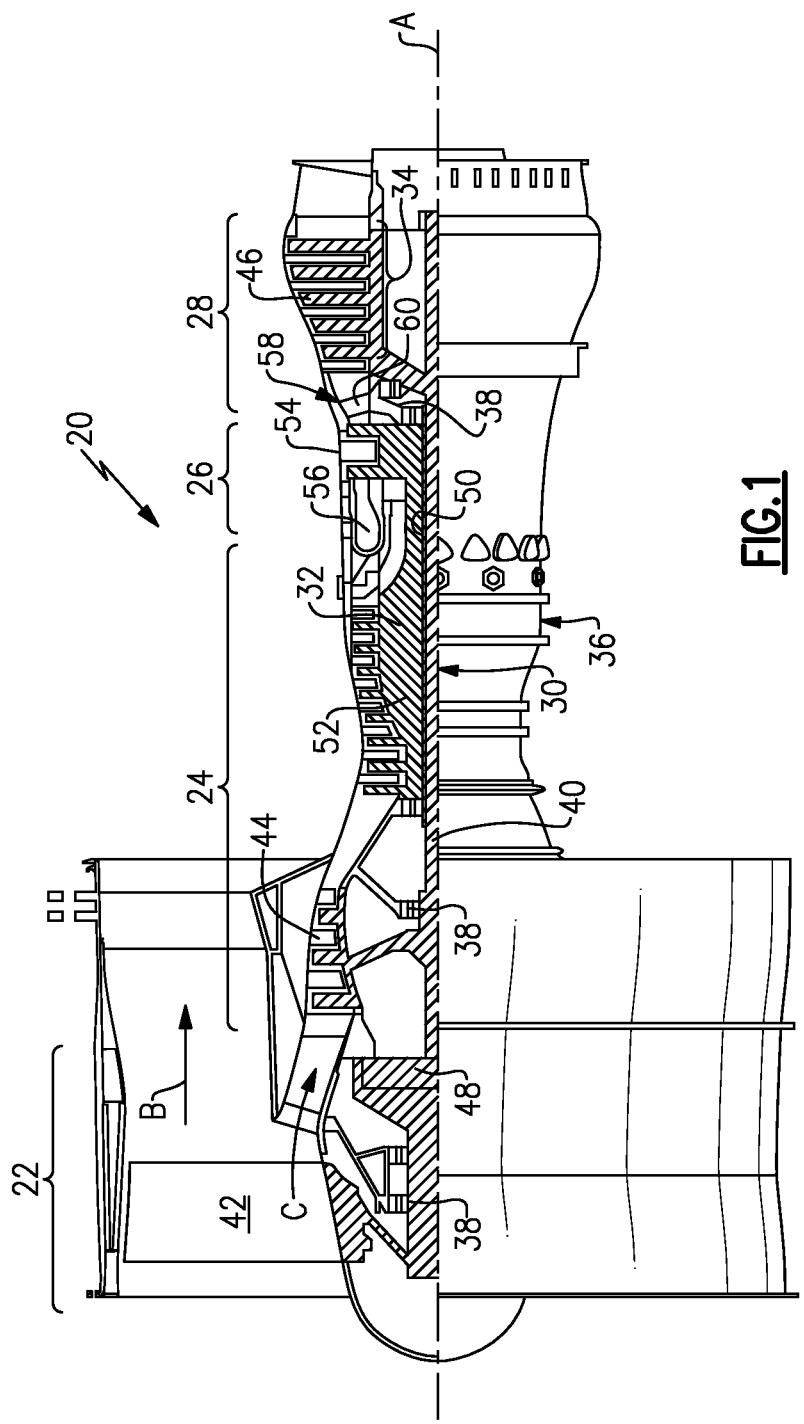
FIG. 1 is a schematic view of an example gas turbine engine incorporating the disclosed airfoil.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor (LPC) section 44 to a low pressure (or first) turbine (LPT) section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section (HPC) 52 and a high pressure (or second) turbine (HPT) section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIGS. 2-5, with continued reference to FIG. 1, gas turbine engine manufacturers increase overall pressure ratio (OPR) in the compressor section to increase thermal efficiency. In order to achieve high OPR, engines are designed with multiple axial compressors in series that operate on their own independent shafts. Example serial compression architectures can provide high OPRs that are greater than about 50 on current engine architectures. The pressure rise for each serial compressor is a consideration in distinguishing performance between each engine architecture configuration.

Figure 2:
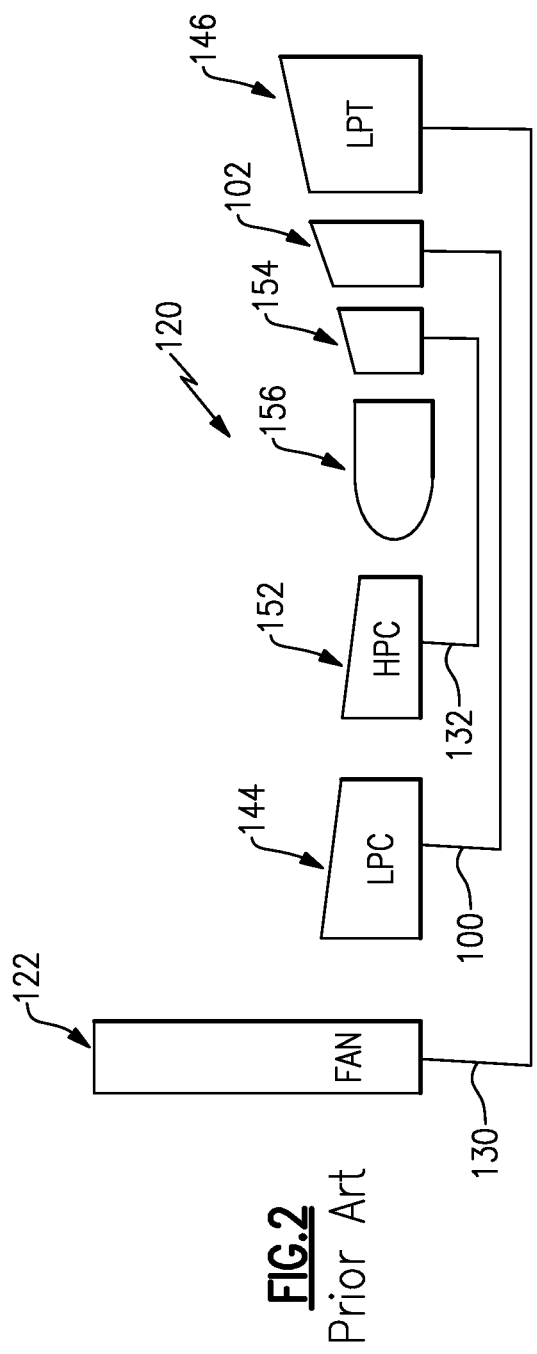
FIG. 2 is a schematic view of one example prior art gas turbine engine.

One example prior art engine 120 includes a three-spool arrangement with a two-spool gas generator and a fan directly driven by a dedicated power turbine (FIG. 2). The fan section 122 is directly coupled to the low pressure turbine 146 by the low speed spool 130. The combustor 156 is arranged axially between the high pressure compressor 152 and the high pressure turbine 154, which are directly coupled to one another by the high speed spool 132. The low pressure compressor 144 is directly coupled to an intermediate pressure turbine 102 by an intermediate speed spool 100.

Figure 3:
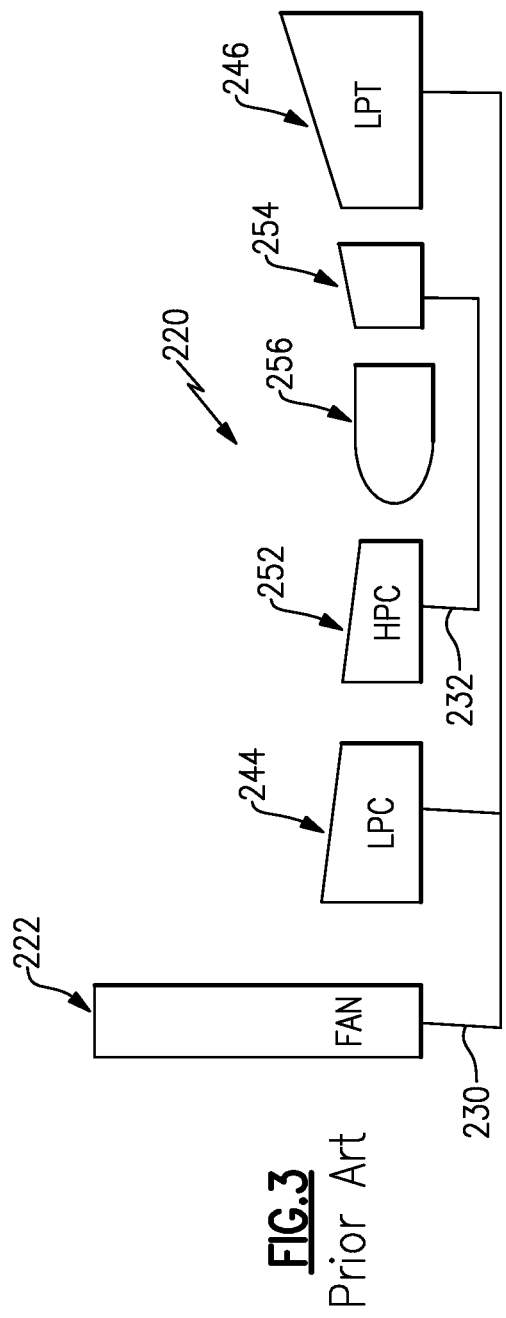
FIG. 3 is a schematic view of another example prior art gas turbine engine.

Another example prior art engine 220 includes a two-spool arrangement with a high pressure ratio single spool core and a booster compressor tied directly to the fan (FIG. 3). The fan section 222 and the low pressure compressor 244 are directly coupled to the low pressure turbine 246 by the low speed spool 230. The combustor 256 is arranged axially between the high pressure compressor 252 and the high pressure turbine 254, which are directly coupled to one another by the high speed spool 232.

An example disclosed geared turbofan engine (FIGS. 1 and 5) includes a unique pressure split between the low and high compressors that enables the example geared turbofan engine to operate at high OPR with high thermal efficiency and minimal mechanical challenges.

Figure 4:
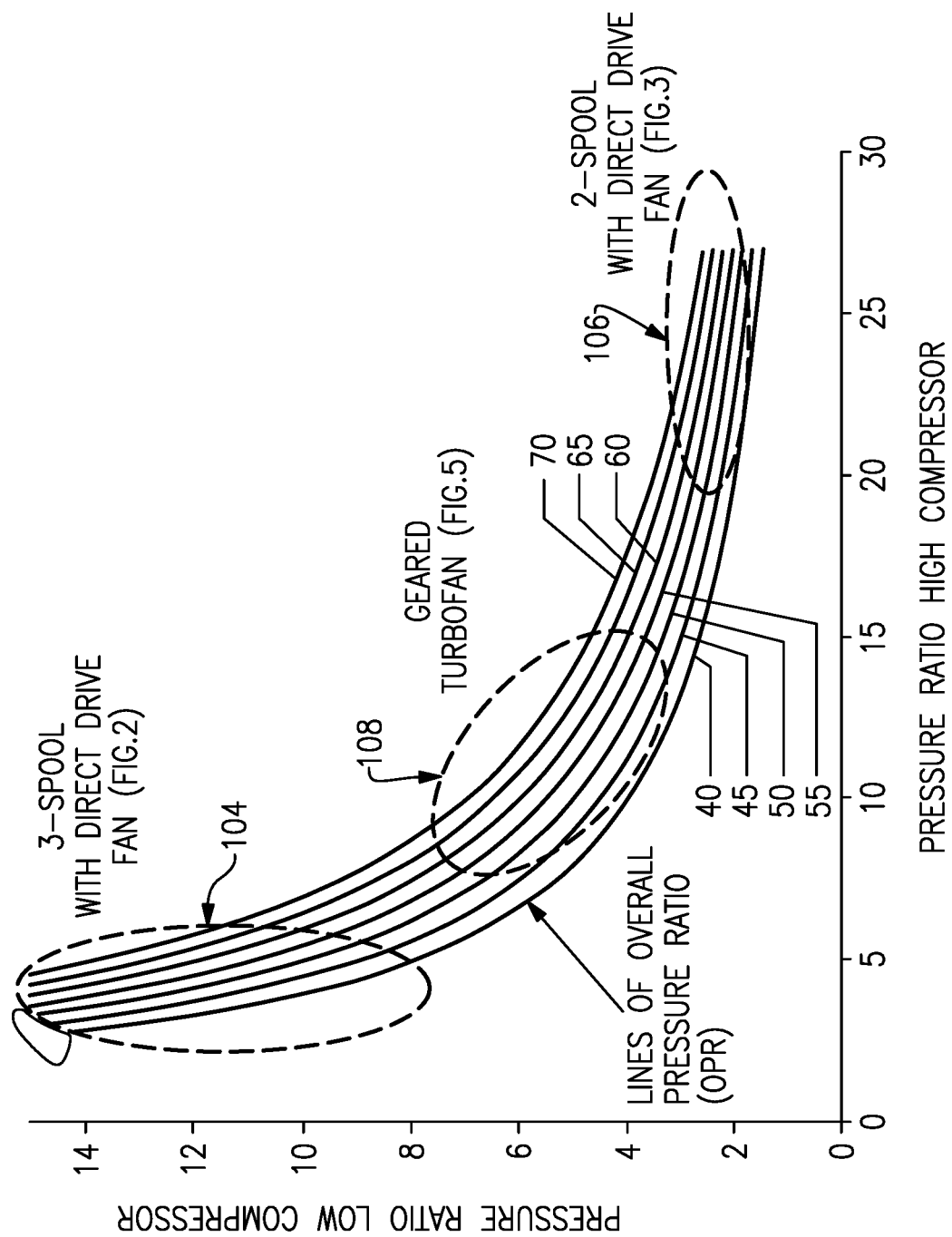
FIG. 4 is a graph depicting the compressor work split for the prior art engines shown in FIGS. 2 and 3 and the gas turbine engine shown in FIG. 5.
Figure 5:
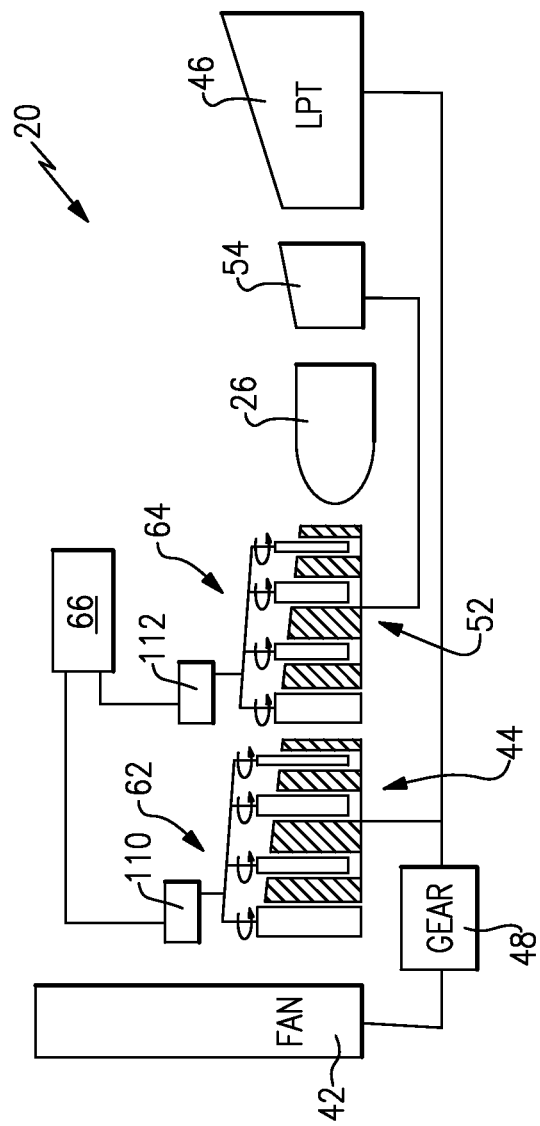
FIG. 5 schematically illustrates the compressor section of the engine of FIG. 1 in more detail.

The unique pressure rise split for the example geared turbofan engine is disposed in region 108 between a pressure rise split for a direct drive three-spool (shown by region 104) and direct drive two-spool engine architecture (shown by region 106), as depicted in the graph of FIG. 4. The core, for purposes of this disclosure and FIG. 4, includes a moderate pressure ratio high compressor (about 8-15, or 8:1 to 15:1) and is boosted by a moderate pressure ratio (about 4-7, 4:1) low pressure ratio compressor that is geared to the fan. OPRs are shown in the range of 40-70 (40:1 to 70:1). However, the region 108 may include OPRs of great than 70 (70:1).

The reduced pressure ratio on the high compressor corresponds to a lower high pressure turbine (HPT) pressure ratio and reduces the required mechanical shaft speed to maintain favorable aerodynamic efficiencies. The reduction in mechanical shaft speed enable reduction in structural support requirements that in turn reduces the structural design requirements for the rear of the high compressor and the high turbine disks. The reduced structural requirements are due to reduced blade pull at increased temperatures present at the higher OPR that is enabled by the geared turbofan configuration. Consequently, for a given level of structural requirements, the new pressure rise split allows for even higher OPR, that is, OPRs of great than 70 (70:1).

A disclosed example geared turbofan engine architecture (FIG. 5) includes variable guide vanes (VGV) for controlling each of the high and low compressors. In this example, one or more circumferential arrays of first VGV 62 controls airflow into and through the low pressure compressor 44 (LPC) and one or more circumferential arrays of second VGV 64 controls airflow into and through the high pressure compressor 52. The first VGVs 62 are arranged downstream from the fan section 42, but upstream from the last stage of the LPC 44. The VGVs 64 are arranged downstream from the LPC 44 and upstream from the combustor 26. A controller 66 governs actuation of each stage of VGVs 62, 64 about its radial axes via actuators 110, 112 to control operation of the corresponding LPC 44 and HPC 52.

In this example each set of VGV 62, 64 include vanes corresponding with each compressor stage within each of the LPC 44 and the HPC 52. Moreover it is within the contemplation of this disclosure that the VGVs 62, 64 could be independently adjustable to tailor operation of each of the LPC 44 and the HPC 52.

The example sets of VGVs 62, 64 each include several vanes that can be controlled in unison or that may be controlled to be set at differing orientations for each corresponding stage to govern and tailor compressor operation to current engine operating conditions.

The example sets of VGVs 62, 64 of the disclosed geared turbofan engine enables the LPC 44 and HPC 52 to better share loading across the entire engine operating range and also enables improved operability performance of the LPC 44 and HPC 52 during load changes. The use of the example sets VGVs 62, 64 enables operation of the LPC 44 and HPC 52 without the use of bleeds which represent lost performance. The improved operability of the example geared turbofan utilizing the example sets VGVs 62, 64 for both the LPC 44 and HPC 52 enables overall improved performance for the engine, and reduced cycle losses to prevent engine surge or stall. FIG. 4 generally shows a work split between the example LPC 44 and HPC 52 that include the sets of VGVs 62, 64. The example sets of VGVs 62, 64 provide benefits for any geared turbofan engine architecture where the low spool drives a fan stage.

The example gas turbofan engine 20 provides approximately a 2% fuel burn reduction with the disclosed pressure ratio split. The fuel burn reduction is achieved by enabling a high OPR with reduced structural requirements relative to conventional direct drive two-spool architecture (FIG. 3). The improved performance is obtained at least in part because the example LPC 44 and LPT 46 are more efficient and accomplishes more work.

The example LPT 46 of the example geared turbofan operates at a higher efficiency than the example HPT 54 and therefore shifting part of the total work to the LPT 46 enables efficiency improvements. Additionally, it does not require the mechanical complexity of three concentric shafts as are required with three-spool engine architecture (FIG. 2).

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a fan including a plurality of fan blades rotatable about an axis;
a compressor section, wherein the compressor section includes a first compressor and a second compressor aft of the first compressor with at least one first variable guide vane controlling operation of the first compressor and at least one second variable guide vane controlling operation of the second compressor, wherein the pressure ratio of the first compressor is in the range of 4:1 to 7:1, and the pressure ratio of the second compressor is in the range 8:1 to 15:1;
a combustor in fluid communication with the compressor section and a turbine section in fluid communication with the combustor, wherein the turbine section includes a first turbine and a second turbine arranged aft of the first turbine; and
a geared architecture driven by the turbine section for rotating the fan about the axis; and
wherein the fan has a total number of the fan blades, the total number of the fan blades being less than 20, and a ratio between the total number of the fan blades and a total number of turbine rotors of the second turbine is between 3.3 and 8.6.

2. The gas turbine engine according to claim 1, wherein the compressor section includes an overall pressure ratio in the range of 40:1 to 70:1.

3. The gas turbine engine according to claim 1, wherein the first compressor and the second turbine mounted to a first spool, and the second compressor and the first turbine mounted on a second spool.

4. The gas turbine engine according to claim 3, wherein the geared architecture is coupled between the first spool and the fan section.

5. The gas turbine engine according to claim 4, comprising:
multiple stages of first variable guides in the first compressor;
multiple stages of second variable guides in the second compressor; and
wherein the compressor section includes an overall pressure ratio in the range of 40:1 to 70:1.

6. The gas turbine engine according to claim 5, wherein the second turbine includes at least 3 turbine rotors but no more than 6 turbine rotors.

7. The gas turbine engine according to claim 6, wherein the at least one first variable guide vane coupled to a first actuator, and the at least one second variable guide vane coupled to a second actuator, and further comprising a controller coupled to the first actuator and the second actuator, the controller operable to cause the first actuator to move the at least one first variable guide vane, and the controller operable to cause the second actuator to move the at least one second variable guide vane.

8. The gas turbine engine according to claim 7, wherein the second turbine includes 5 turbine rotors.

9. The gas turbine engine according to claim 8, wherein the at least one first variable guide vane and the at least one second variable guide vane are independently adjustable.

10. The gas turbine engine according to claim 1, wherein the geared architecture is arranged forward of the combustor.

11. The gas turbine engine according to claim 1, comprising multiple stages of first variable guides in the first compressor.

12. The gas turbine engine according to claim 11, comprising multiple stages of second variable guides in the second compressor.

13. The gas turbine engine according to claim 1, comprising multiple stages of second variable guides in the second compressor.

* * * * *